US008323441B1

(12) United States Patent
Jodoin

(10) Patent No.: US 8,323,441 B1
(45) Date of Patent: Dec. 4, 2012

(54) ANTI-THEFT AND ANTI-CORROSIVE TRACKING CODE METHOD

(75) Inventor: Martin Jodoin, St-Charles-Borromee (CA)

(73) Assignee: Marquage Antivol Sherlock Inc., Longueuil, Quebec (CA)

( * ) Notice: Subject to any disclaimer, the term of this patent is extended or adjusted under 35 U.S.C. 154(b) by 43 days.

(21) Appl. No.: 13/109,373

(22) Filed: May 17, 2011

(51) Int. Cl.
*B32B 37/14* (2006.01)

(52) U.S. Cl. ........................... 156/253; 156/62; 156/252

(58) Field of Classification Search .................... 156/62, 156/250, 252, 253, 237, 268
See application file for complete search history.

(56) References Cited

U.S. PATENT DOCUMENTS

| | | | | |
|---|---|---|---|---|
| 4,674,239 | A | 6/1987 | Jodoin | |
| 6,127,034 | A * | 10/2000 | Chorley | 428/900 |
| 6,953,206 | B1 * | 10/2005 | Dilz et al. | 428/916 |
| 2006/0167702 | A1 * | 7/2006 | Jodoin | 705/1 |

FOREIGN PATENT DOCUMENTS

| | | |
|---|---|---|
| CA | 1200391 | 2/1986 |
| WO | 2004037618 | 5/2004 |

* cited by examiner

*Primary Examiner* — Katarzyna Wyrozebski Lee
*Assistant Examiner* — John Blades
(74) *Attorney, Agent, or Firm* — Norton Rose Canada LLP

(57) ABSTRACT

An anti-theft marking method for the protection and tracking of objects and/or parts thereof is described. The method comprises assigning an identification code for the object and/or parts thereof to be protected by the code. The method further comprises identifying metal parts of the objects and/or parts thereof which are susceptible to rust and/or which are painted and susceptible to chipping and on which the code is to be engraved. A permanent transparent elastomeric adhesive tape is then applied over a region of the object and/or parts thereof where the code is to be engraved. Characters of the code are then engraved over the elastomeric tape and a clear protective lacquer is applied over the engraved code to seal perforations in the elastomeric adhesive tape made by the engraved code.

12 Claims, 3 Drawing Sheets

ANTI-THEFT AND ANTI-CORROSIVE TRACKING CODE METHOD

TECHNICAL FIELD

The invention relates to an anti-theft and anti-corrosive tracking code applied to metal parts by a novel method whereby to identify stolen objects and/or parts thereof protected by the code.

BACKGROUND OF THE ART

In PCT application PCT/CA2002/001624 there is described a method of preventing theft by extensive marking of automobiles. These markings are used to identify the vehicle for title and registration purposes and to reduce car theft by making it extremely difficult, if not impossible to re-sale a vehicle or parts thereof. Unfortunately, as mentioned therein these identification marks can be altered or obliterated by skilled individuals.

There is presently on the market processes for engraving permanent markings on surfaces of materials such as glass, plastic and metal. As described in the aforementioned PCT application such method use an abrasive blasting gun assembly and a stencil on which a code is cut-out therein and positions against a surface to be abraded by sand blasting. However, when such markings are made on metal parts which are susceptible to corrosion, because the sand blasting does penetrate very deeply into the metal and because some of these metal parts are exposed to the environment, rust will form in the marking and slowly degrade and damage the marking making it difficult to identify the code. This complicates the tracking of stolen vehicles or parts There is therefore a need to develop a better method of engraving codes on objects to protect the code against damage by foreign elements or otherwise.

SUMMARY OF THE INVENTION

It is a feature of the present invention to provide an anti-theft marking method for the protection of identification codes abraded or engraved objects and/or parts thereof and which substantially overcomes the above-mentioned disadvantages.

It is a further feature of the present invention to provide a method which protects an identification code abraded or engraved on metal parts subject to corrosion and or paint chipping and particularly those which are exposed to the environment.

According to the above feature, from a broad aspect, there is provided an anti-theft marking method for the protection and tracking of objects and/or parts thereof is described. The method comprises assigning an identification code for the object and/or parts thereof to be protected by the code. The method further comprises identifying metal parts of the objects and/or parts thereof which are susceptible to rust and/or which are painted and on which the code is to be engraved. A permanent transparent elastomeric adhesive tape is then applied over a region of the object and/or parts thereof where the code is to be engraved. Characters of the code are then engraved over the elastomeric tape and a clear protective lacquer is thereafter applied over the engraved code to seal perforations in the elastomeric adhesive tape made by the engraved code.

A preferred embodiment of the present invention will now be described with reference to the accompanying drawings, in which:

DETAILED DESCRIPTION OF THE PREFERRED EMBODIMENTS

Figure 1:
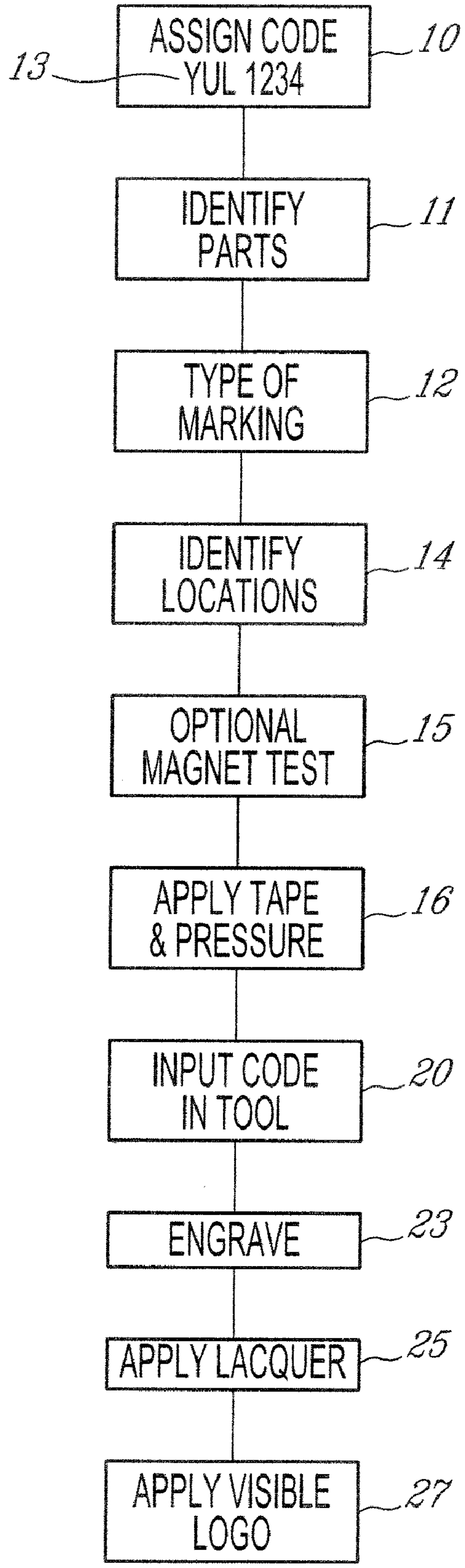
FIG. 1 is a flow diagram illustrating the anti-theft improved marking method of the present invention.

Referring now to FIGS. 1 to 5 there will be described the anti-theft marking method of the present invention. As shown in FIG. 1, the anti-theft marking method of the present invention has been developed particularly for the protection of identification codes which are engraved in metal parts of an object or and/or parts thereof to be protected by the code. The method comprises various steps in the process and firstly there is provided the step 10 of assigning a code to an object which is identified in association with the code. Depending on the object to be protected, the method further comprises the step 11 of identifying metal parts of that object on which the code is to be engraved. Some of the parts of the object may not require the affixing of the code by engraving, for example wherein the code is to be applied to glass and wherein an other type of marking device is required, such as a sand blasting gun as described in Canadian Patent No. 1,200,391 issued in 1986. Therefore step 12 also comprises identifying the type of marking to be affixed to the object and/or parts thereof.

Figure 2:
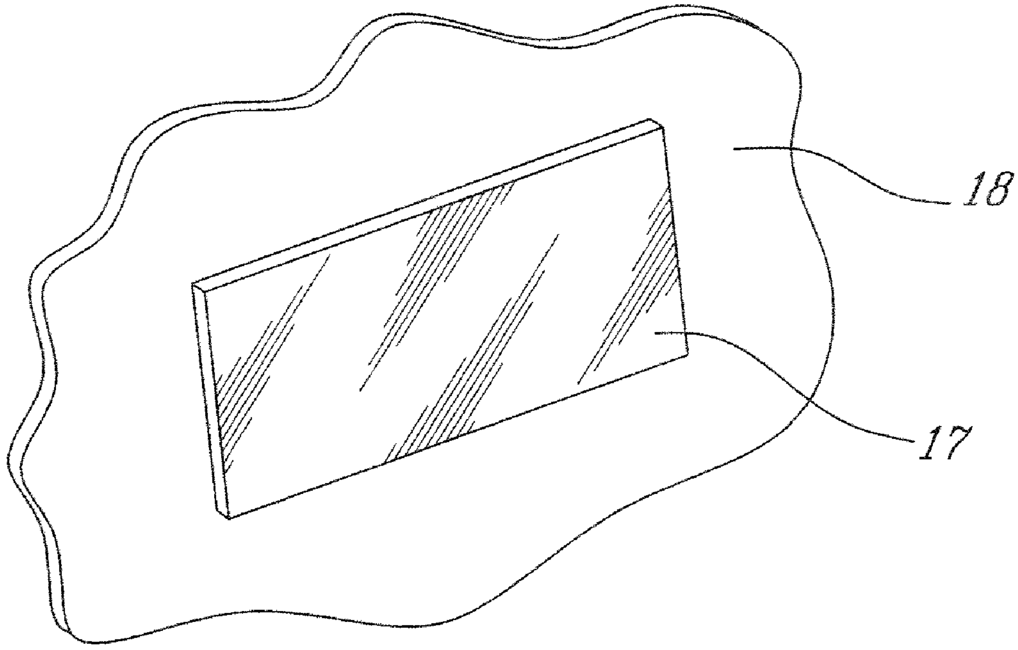
FIG. 2 is a perspective view showing the permanent transparent elastomeric adhesive tape secured over a region of an object on which an identification code is to be engraved.

Once the metal parts are identified, it is then necessary to identify the location on which the tracking identification code 13 as shown in step 10 is to be applied. This identification is defined by step 14. Certain other parts are affixed to the tracking code by the sand blasting method. To determine if the metal part is susceptible to rust and/or chipping, there is provided an optional step 15 of applying a magnet to the metal part to determine if the part is ferromagnetic and susceptible to rust and as such then the engraved code would be susceptible to rusting and degradation by rust, as above-mentioned. The next step 16 is to apply a permanent transparent elastomeric adhesive tape 17 on the metal part 18 as shown in FIG. 2 and in the area where the tracking identification code is to be applied.

Figure 3:
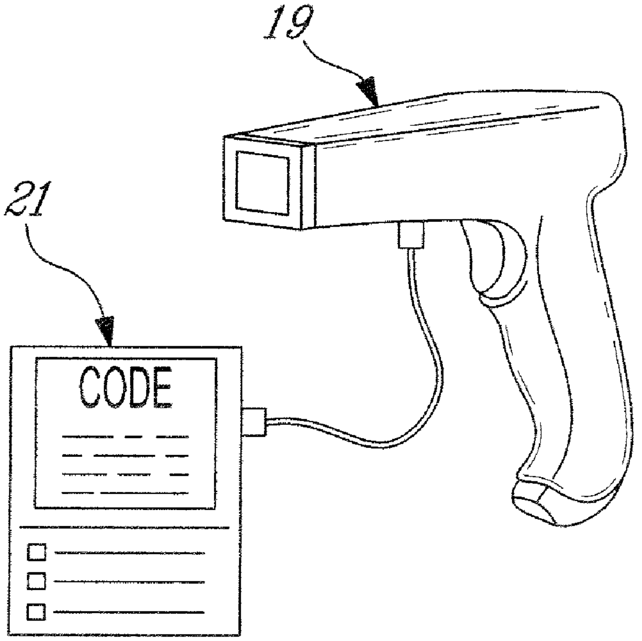
FIG. 3 is a schematic view showing an engraving device which is imported with a code to be engraved over the transparent elastomeric adhesive tape as shown in FIG. 2.

With reference to FIG. 3, the next step in the process is to input the code in an engraving tool 19 shown in FIG. 3. The inputting step is identified by block 20 in FIG. 1 and such can be done by a computer 21 which programs the engraving tool 19 to engrave the code into the metal part 18 through the permanent transparent elastomeric adhesive tape 17. It is pointed out that several types of objects and/or parts thereof which contain metal parts can be provided with engraved codes as described by the method of the present invention. For example, these objects can comprise automobiles, industrial vehicles, water crafts, air crafts and industrial and commercial machinery, to state a few examples thereof. The code can also be engraved by a hand engraving tool having an engraving bit displaced by the hand of a person.

Figure 4:
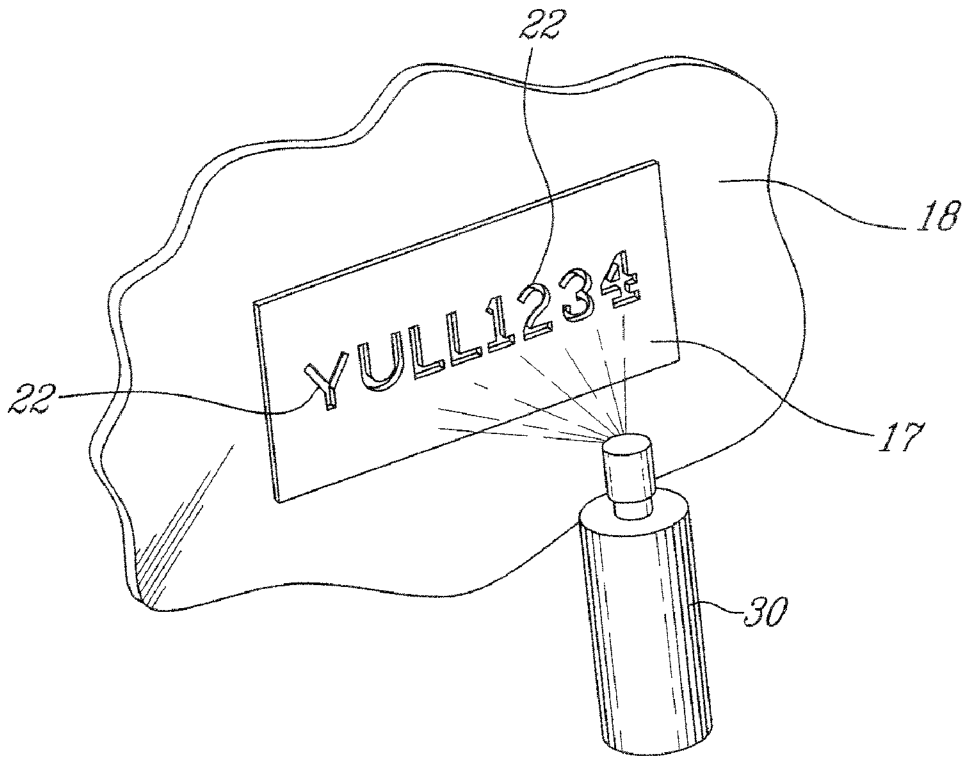
FIG. 4 is a perspective view showing a protective lacquer being applied over the elastomeric adhesive tape in which the identification code has been engraved whereby to seal the code.

As shown in FIG. 4 the code is engraved through the elastomeric adhesive 17 and this engraving results in perforations being made in the tape 17, these perforations being identified by reference numeral 22 in FIG. 4. The engraving step is identified by block 23 in FIG. 1. As shown in FIG. 4 a lacquer spray 24, applied by an aerosol can 30 or by a brush, seals the perforations 22 in the tape 17 whereby the tracking identification code 13 is sealed, as well as the environment thereof, and the code is protected by the tape 17 and the lacquer in the perforations. The step of applying the lacquer is identified by block 25 in FIG. 1.

Figure 5:
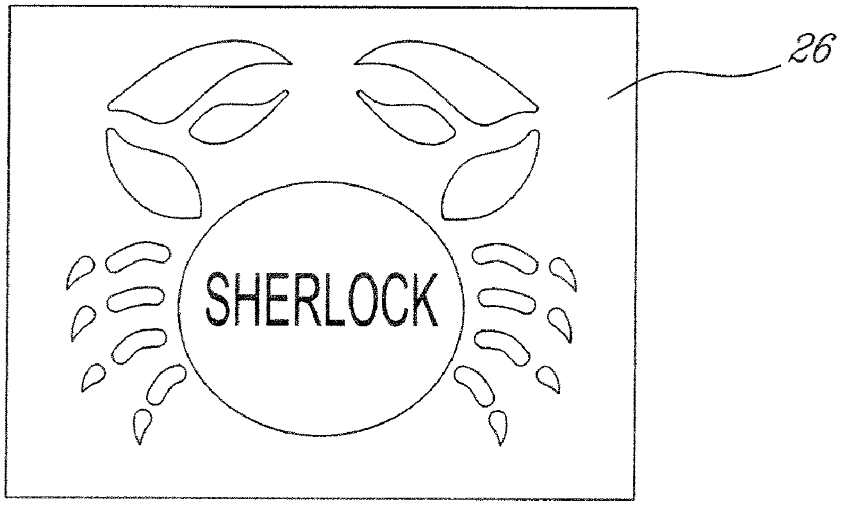
FIG. 5 is a front view of a transparent logo sticker which is adhesively secured to an object protected by the anti-theft marking method of the present invention.

In order to discourage theft of the object and/or parts thereof having been protected by the tracking identification code of the present invention, a visible logo 26, as shown in FIG. 5, is applied to a visible area of the object to signal to a would-be thief that the object in question and/or parts thereof have been engraved with tracking codes to dissuade the thief from stealing the object. This step is identified by block 27 in FIG. 1.

It is also pointed out that when the tape is applied to the object and/or parts thereof, it is preferable to apply pressure on the elastomeric adhesive tape to expulse any air that may be trapped under the tape, particularly in the region where characters of the code are to be engraved. Also, as mentioned above, the engraving tool 19 may be of different type such as an electric engraving tool or a percussion engraving tool, known in the art. It is also preferable to make sure that the part on which the tape is to be applied has been cleansed of any foreign soiling substances. It is also pointed out that the elastomeric adhesive tape provides another advantage during the engraving of the tracking identification code, and particularly when applied over a painted surface, as the tape prevent the paint from chipping by the engraving bit. As well, the elastomeric adhesive tape is one which is resistant to abrasion, scratches and erosion. Such tapes are also known in the art and provided for entirely different purposes. One such tape is a highly transparent aliphatic polyurethane film which has a strong permanent adhesive acrylic compound. Another of such tape is one which a polyurethane elastomer which is long-aging and provided with a pressure sensitive acrylic adhesive. These tapes are also solvent-resistant, and have a pressure-sensitive acrylic adhesive which is protected by a release liner which is removed only when the tape is to be applied. Such tapes are also very resistant to deterioration by road salts which contain calcium and which attacks metal parts of vehicles which are not well protected against rust formation.

It is within the ambit of the present invention to cover any obvious modifications of the preferred embodiment described herein provided such modifications fall within the scope of the appended claims.

The invention claimed is:

1. An anti-theft marking method for the protection and tracking of an object and/or parts thereof, said method comprising the steps of i) assigning and identification code for said object and/or parts thereof to be protected by said code;

ii) identifying metal parts of said objects and/or parts thereof which are susceptible to rust and/or which are painted and susceptible to chipping and on which said code is to be engraved;

iii) applying a permanent transparent elastomeric adhesive tape over a region of said object and/or parts thereof where said code is to be engraved;

iv) engraving characters of said code over said elastomeric adhesive tape, and v) applying a clear protective lacquer over said engraved code to seal perforations in said elastomeric adhesive tape made by said engraved code.

2. An anti-theft marking method as claimed in claim 1, wherein after said step (iv) and before said step (v) there is provided the step of applying a pressure on said elastomeric adhesive tape to expulse air that may be present under said tape in the region where said characters of said code are to be applied by engraving.

3. An anti-theft marking method as claimed in claim 2, wherein there is further provided the step of positioning a magnet piece on said metal parts on which said code is to be engraved to determine if said metal parts are susceptible to rust.

4. An anti-theft marking method as claimed in claim 1, wherein said elastomeric adhesive tape is a highly transparent aliphatic polyurethane film with a strong permanent adhesive acrylic compound.

5. An anti-theft marking method as claimed in claim 1, wherein said elastomeric adhesive tape is a polyurethane elastomer which is long-aging and provided with a pressure sensitive acrylic adhesive.

6. An anti-theft marking method as claimed in claim 1, wherein said object is a vehicle and/or parts thereof.

7. An anti-theft marking method as claimed in claim 6, wherein said vehicle is an industrial vehicle and/or parts thereof.

8. An anti-theft marking method as claimed in claim 1, wherein said object is one of a road vehicle, a water craft, an aircraft, or industrial or commercial machinery.

9. An anti-theft marking method as claimed in claim 1, wherein said step (iv) comprises engraving said code with an electric engraving tool having inputting means to input said code.

10. An anti-theft marking method as claimed in claim 1, wherein said step (iii) comprises applying said permanent transparent elastomeric adhesive tape over a region which is not readily visible from the exterior.

11. An anti-theft marking method as claimed in claim 10, wherein there is further provided the step of applying a visible logo and/or printed message on a visual area of said object to indicate that said object is protected with said anti-theft marking code.

12. An anti-theft marking method as claimed in claim 1, wherein said elastomeric adhesive tape prevents paint chipping during said step (iv) of engraving as well as being resistant to abrasion, scratches and erosion; said protective lacquer preventing the formation of rust in the area of said engraved characters.

* * * * *